Oct. 8, 1957 — R. E. COLLINS — 2,808,679
PEST EXTERMINATOR
Filed Dec. 13, 1955 — 2 Sheets-Sheet 1
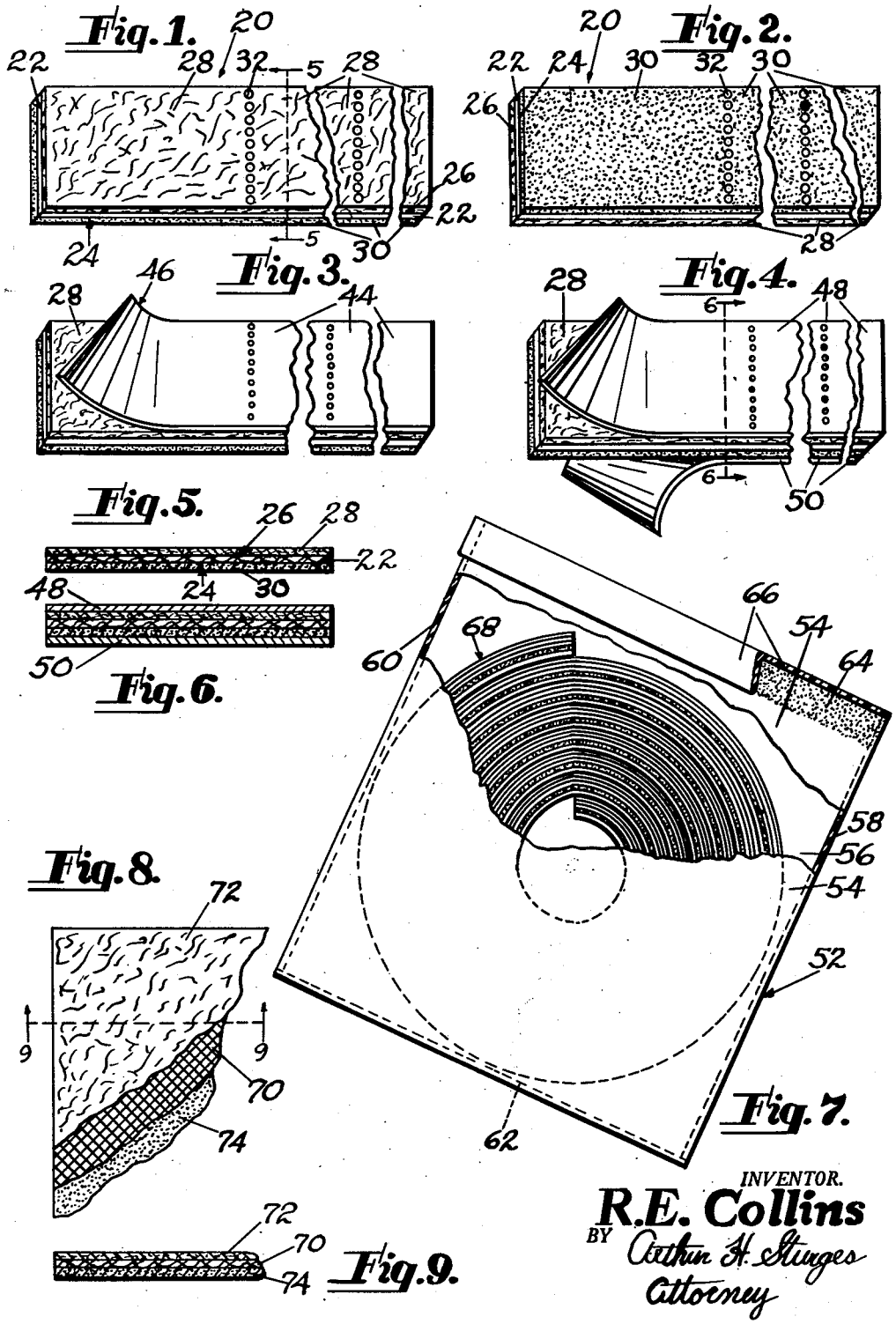
INVENTOR.
R. E. Collins

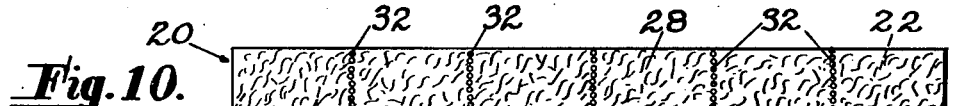
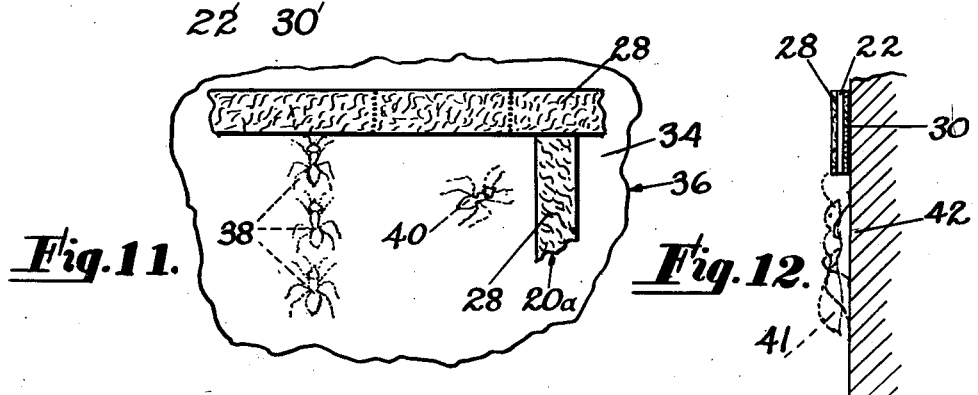
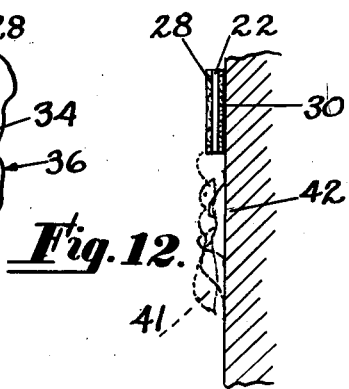
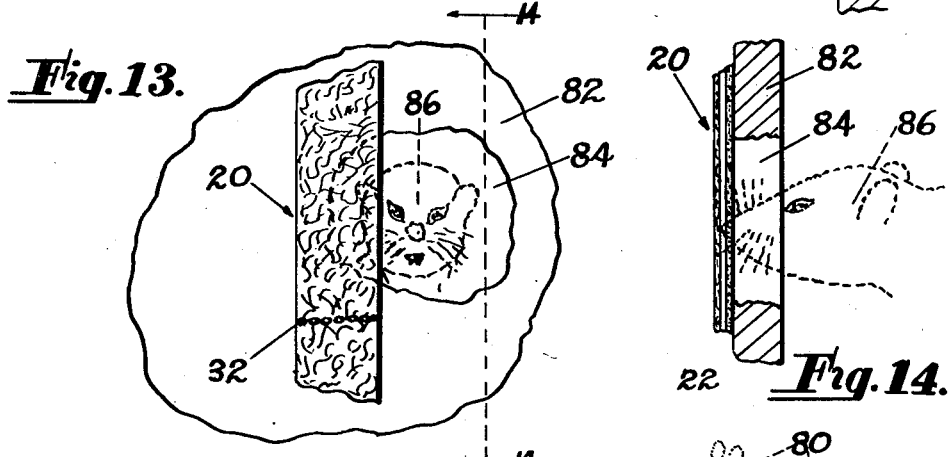
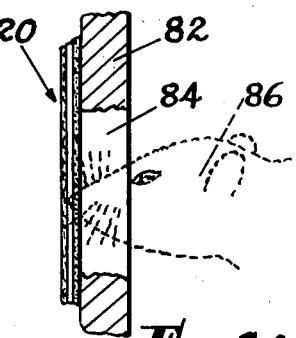
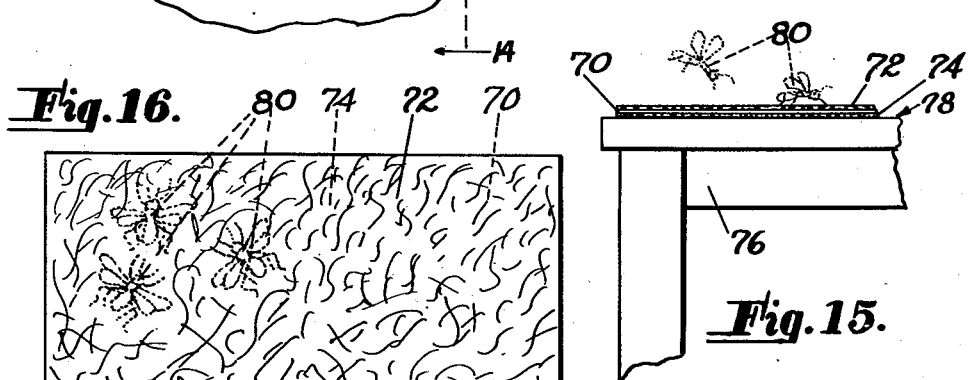
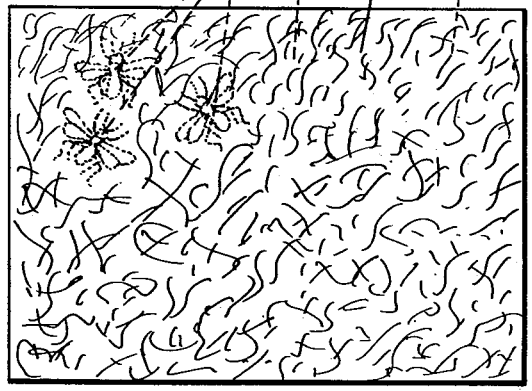

United States Patent Office 2,808,679
Patented Oct. 8, 1957

2,808,679

PEST EXTERMINATOR

Richard E. Collins, Omaha, Nebr., assignor to Paramount Paper Products Co., Omaha, Nebr., a corporation of Nebraska Application December 13, 1955, Serial No. 552,877

7 Claims. (Cl. 43—131)

The instant invention relates to insects and rodents, and means for an extermination thereof, and more particularly to such pests that inhabit dwellings and the like.

It is an object of the invention to provide an article of manufacture for an elimination of ants, house flies and the like, together with other flying and crawling insects.

Another object of the invention is to provide a device or article which may be readily manipulated for the said purpose, the said article to be of economical construction and of a comparatively low retail cost price to users.

Yet another object of the invention is to provide a device for the above-stated purposes which may be retailed in package form and in a manner whereby its container or envelope may be hermetically sealed for preventing the contents of the container from contact with the atmosphere prior to use.

A further object of the invention is to provide a device, the longitudinal length of which may be readily manually severed into portions thereof prior to use, the said portions being susceptible of being secured in selected positions and to different objects during use.

Other and further objects and advantages of the invention will be understood from the following detailed description thereof.

In the drawings:

Figure 1 is a perspective view of the new article, and showing it in elongated strip form, certain portions thereof being broken away.

Figure 2 is a view similar to Figure 1, and showing the opposite side of said article with respect to the showing thereof in Figure 1.

Figure 3 is a perspective view of a modification of the device shown in Figure 1, and depicts a protective sheathing or guard preferably employed for one side of the device, said guard-sheathing being in a partially detached position.

Figure 4 is a view similar to Figure 3 and illustrates a further modification with respect to both Figures 1 and 3. The modification shown in Figure 4 depicts a protective sheathing for both sides of the article, portions of said guard-sheathings being illustrated partially detached.

Figure 5 is a transverse sectional view on an enlarged scale, the view being taken on line 5—5 of Figure 1.

Figure 6 is a transverse sectional view on said scale, the view being taken on line 6—6 of Figure 4.

Figure 7 is a plan view of the package of the instant invention, certain portions of its container being broken away, and showing the modification depicted in Figure 4 in coiled form within the container.

Figure 8 is a plan view of a fragment of a further modification, the latter being particularly useful for eliminating flies and the like.

Figure 9 is a transverse section taken approximately on line 9—9 of Figure 8.

Figure 10 is a top plan view, on a reduced scale, of the article shown in Figure 1.

Figure 11 is a top plan view of a portion of a horizontally disposed floor or the like, and showing portions of the new device applied to the upper surface of the said floor, and with respect to the line of travel of a column of ants, the latter being represented by broken lines.

Figure 12 depicts the new device attached to a vertically disposed wall surface or the like.

Figure 13 illustrates a portion of the new device attached across and adjacent to an opening through a wall, baseboard, or the like, said opening being used as a runway for a mouse, the latter being represented by broken lines, and said baseboard being broken away.

Figure 14 is a transverse sectional view taken substantially on line 14—14 of Figure 13.

Figure 15 is an edge view, on a reduced scale, of the modification shown in Figure 8 and showing the device disposed in a position of use and secured to a portion of a table top or the like.

Figure 16 is a top plan view of the device shown in Figure 15, the table top being omitted.

While one embodiment of the invention and modifications are illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

Referring now to the drawings for a more particular description, in which like numerals of reference designate like or corresponding parts throughout the several views, and first to Figures 1, 2, and 10, the numeral 20 indicates the entire invention and 22 a medially disposed lamination thereof. Preferably and for certain uses, the member 22 is in the form of an elongated strip of a suitable flexible material such as woven cloth, paper, or the like, having oppositely disposed side surfaces 24 and 26, as best indicated in Figure 5. The side 24 of the member 22 is provided with a suitable poison 28 secured thereto by any suitable means. The poison 28 is complemental to the susceptibility of the insect, rodent, or the like to be exterminated. For ants, roaches, and the like, the poison may include dichloro diphenyl trichloroethane, namely $C_{14}H_9Cl_5$, or chlordane, namely $C_{10}H_6Cl_8$, or an admixture of both of said poisons. The other side 26 of the member 22 is provided with a suitable adhesive indicated at 30. Preferably the adhesive 30 is provided with a rubberized base and a pressure-sensitive surface for maintaining the device in a position of use, as later described.

The device 20, shown in Figure 10, is approximately one foot long, and further includes spaced apart rows of transversely disposed apertures, said rows being indicated at 32, for weakening the construction, whereby an operator may readily sever a selected length portion of the device from the main body portion between selected rows thereof, for use, and in instances where he does not desire to employ the entire length of the strip, and for purposes later described.

The device 20 is approximately one foot long at times when it is marketed in packages of juxtaposed devices, and of a greater length of approximately 10 or 12 feet at times when it is packaged and marketed in coiled form, as shown in Figure 7, and as more minutely described with respect to the modification shown in Figure 4.

For certain uses, the poison 28 disposed on the side surface 24 of the member 22 includes an admixture of adhesive, and similarly the adhesive 30 disposed on the side 26 of the member 22 contains an admixture of the said poison.

The device shown in Figures 1, 2, and 10 preferably includes a suitable bait admixed with said poison, said bait being complemental to the taste characteristics of the insect or animal to be exterminated.

It is well known that ants travel in a column on kitchen floors and the like, and during use, a selected length of the device 20 is caused to be adhesively secured to the surface 34 of the floor 36 across the line of travel of the column of ants 38, the latter being represented by broken lines, as shown in Figure 11, and with the poisonous side 28 of the device upwardly and exposed. Since the device is flexible longitudinally as well as transversely, it may be secured to said surface firmly, irrespective of the smoothness or rugosity of said surface, whereby the insects are prevented from crawling under it and must crawl across the exposed surface of the new device, and in doing so become poisoned and exterminated. Should the said column detour from its line of march, as indicated by the individual ant 40, a further strip or portion thereof may be secured to said floor, said further portion being indicated at 20a. Similarly, further strips or portions thereof may be secured to the floor complemental to the direction of detour or travel of the said column.

It is well known that roaches and the like usually congregate in damp locations or the like, in groups, whereby it is possible to surround the habitat of a group by causing several strips of the device to adhere to an object and surround said habitat.

As shown in Figure 12, the new device may be secured to a vertically disposed wall surface 42 of a room, kitchen sink or the like, for use in connection with a vertically moving insect such as the insect 41, and obviously the new device may be secured to the bottom surface of an object with equally advantageous results and in instances where a crawling insect moves in an upsidedown position.

Referring to the modification shown in Figure 3, said modification includes the described elements shown in Figures 1, 2, and 10, and in addition thereto an elongated strip of suitable flexible material applied to cover the poison of the above-described device, said strip providing a protective sheathing or guard-lamination 44 for preventing contact of the poison with the atmosphere. As shown in Figure 3, a portion indicated at 46 of the guard-lamination 44 is depicted peeled off of the poison 28 for convenience of illustration, and it will be understood that prior to use the said guard strip 44 is entirely removed from the device and discarded, whereby during use the operation is the same as heretofore described.

The modification shown in Figure 4 includes a guard strip or lamination 48 which is of the same construction as described with respect to the guard strip 44, and employed for the same purpose. The modification shown in Figure 4 further includes a second guard strip or further lamination 50 secured to the main body portion of the device on the opposite side thereof with respect to the strip 48, whereby both sides of the modification shown in Figure 4 are normally sealed for preventing exposure to the air and maintaining said poison, bait, and adhesive in fresh condition prior to use, and since said guard strips 48 and 50 are flexible, the device may be formed into a coil, as indicated at 68 in Figure 7, whereby at times when the device is marketed in a 10-foot or greater length, the new device may be coiled upon itself to occupy a comparatively small space, and marketed in a package. The latter includes a suitable container or envelope indicated at 52. The container includes oppositely disposed side walls 54 and 56 connected together by means of oppositely disposed end walls 58 and 60, together with a wall 62 which is oppositely disposed with respect to the normally open end or mouth of the container. The side wall 54 is provided with a suitable adhesive 64 adjacent the mouth of the package, said adhesive extending the entire distance across the side wall 54.

The side wall 56 of the package terminates in a flap portion 66, which extends across the adhesive 64. The package is hermetically sealed after the insertion of the coil 68 therein by compacting the flap 66 against the adhesive 64 for preventing the oppositely disposed sides of the coil from contact with the atmosphere during distribution of the package to the ultimate user, and prior to use. In addition to the guard strip sheathing or lamination 44 preventing the substances which it covers from contact with the air, said lamination also prevents the convolutions of the coil 68 from clinging together unduly at times when the device is marketed in a package.

Referring to Figures 8, 9, and 16, the modification there depicted is particularly adapted for use in the extermination of household flies, and includes a medial lamination 70. The lamination 70, as best shown in Figure 16, is of rectangular contour in plan, having a suitable poisonous substance 72 disposed on one side thereof, said substance having an admixture therewith of a suitable bait. Preferably, the poison 72 includes an admixture of O,O-dimethyl-1-hydroxy-2,2,2-trichloroethylphosphonate, and the bait admixed therewith preferably includes sugar.

On the opposite side of the lamination 70 with respect to the poison side thereof, a suitable adhesive 74 is provided on said opposite side. The adhesive 74 need not necessarily be spread over the entire surface of said opposite side, but may be applied in patches sufficient to cause the device to adhere during use as later described.

Referring to Figure 15, the latter depicts a portion of a table or a like household article having a horizontally disposed surface 78. During use, the fly exterminator shown in Figure 16 is placed upon the surface 78 and caused to adhere thereto, since the adhesive 74 is pressure sensitive, whereby the device is maintained in a horizontal position and attached to the surface 78 during use, said attachment preventing the device from contact with other articles in the room of a dwelling where employed incident to currents of air tranversing said room, while at the same time the poison and bait side of the device is maintained upwardly for attracting insects, the latter being indicated at 80 in Figures 15 and 16 by means of broken lines, whereby the insects become poisoned by consumption of or contact with said poison.

Referring to Figures 13 and 14, a portion of a baseboard of a room of a dwelling or the like is indicated at 82, having a runway or aperture 84 therethrough such as are employed by mice, one of the latter being represented by broken lines and indicated at 86. During use, a portion of the device is caused to adhere to the baseboard as heretofore described, and across a portion of the aperture 84, and since at times when the admixture of adhesive, bait and poison is applied to both sides of the medial lamination of the device, said bait and poison are presented to the mouse 86 during its exit from or entrance into the aperture 84 for the advantage thereof.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore a more lengthy description is regarded as unnecessary.

Changes in shape, size and rearrangement of details and parts such as come within the purview of the invention claimed may be resorted to in actual practice, if desired.

What I claim as new and desire to secure by Letters Patent is:

1. A pest exterminator, comprising a lamination, a poisonous substance disposed on one side of said lamination, an adhesive secured to the opposite side thereof with respect to its poison bearing side, a guard normally disposed on the outer side of said poison, and a second guard disposed on the outer side of said adhesive, said lamination and said guards being flexible and elongated in plan whereby they may be formed in convolutions of progressively greater diameter about each other for providing a compact package, and said poison and adhesive prevented from contact with the atmosphere prior to use, said guards being readily removable prior to said use.

2. A pest exterminator as defined in claim 1 which further includes a suitable bait admixed with the poison thereof.

3. A pest exterminator, comprising a first flexible lamination, a poisonous substance disposed on one side of said lamination, an adhesive secured to the opposite side of said lamination, a second flexible lamination removably disposed upon the exposed side of said poisonous substance and a third flexible lamination removably disposed upon the exposed side of said adhesive.

4. A pest exterminator, comprising a first flexible lamination, a poisonous substance disposed on one side of said lamination, an adhesive secured to the opposite side of said lamination, a second flexible lamination removably disposed upon the exposed side of said poisonous substance and a third flexible lamination removably disposed upon the exposed side of said adhesive, said exterminator being provided with a plurality of spaced apart transversely disposed rows of apertures for facilitating a manual separation of portions of the exterminator between selected rows of apertures.

5. A pest exterminator, comprising a first flexible lamination, a particulate mixture of bait and poisonous substance mounted substantially co-extensively with one side of said lamination, an adhesive secured to the opposite side of said lamination, a second flexible lamination removably disposed upon the exposed side of said mixture and a third flexible lamination removably disposed upon the exposed side of said adhesive.

6. A pest exterminator comprising a flexible substantially flat lamination, a particulate mixture of bait and poisonous substance adhesively disposed directly on the surface of one side only of said lamination presenting a uniform roughened surface poisonous to a pest coming in contact with the surface at any location thereof, an adhesive secured to the opposite side of said lamination, and a supporting flexible lamination attached to the opposite side of said adhesive to provide a support surface.

7. A pest exterminator comprising a flexible substantially flat lamination, a particulate mixture of bait and poisonous substance disposed on the surface of one side only of said lamination presenting a uniform roughened surface poisonous to a pest coming in contact with the surface at any location thereof, an adhesive substantially forming an admixture with said bait and poisonous substance on said one side of the lamination whereby the bait and poison adhere to the laminate, an adhesive secured to the opposite side of said lamination, and a supporting flexible lamination attached to the opposite side of said adhesive to provide a support surface.

References Cited in the file of this patent

UNITED STATES PATENTS

| 2,143,043 | Wexler | Jan. 10, 1939 |
| 2,157,449 | Berg | May 9, 1939 |
| 2,315,772 | Closs | Apr. 6, 1943 |

FOREIGN PATENTS

| 339,181 | Great Britain | Dec. 4, 1930 |